United States Patent Office 3,572,169
Patented Mar. 23, 1971

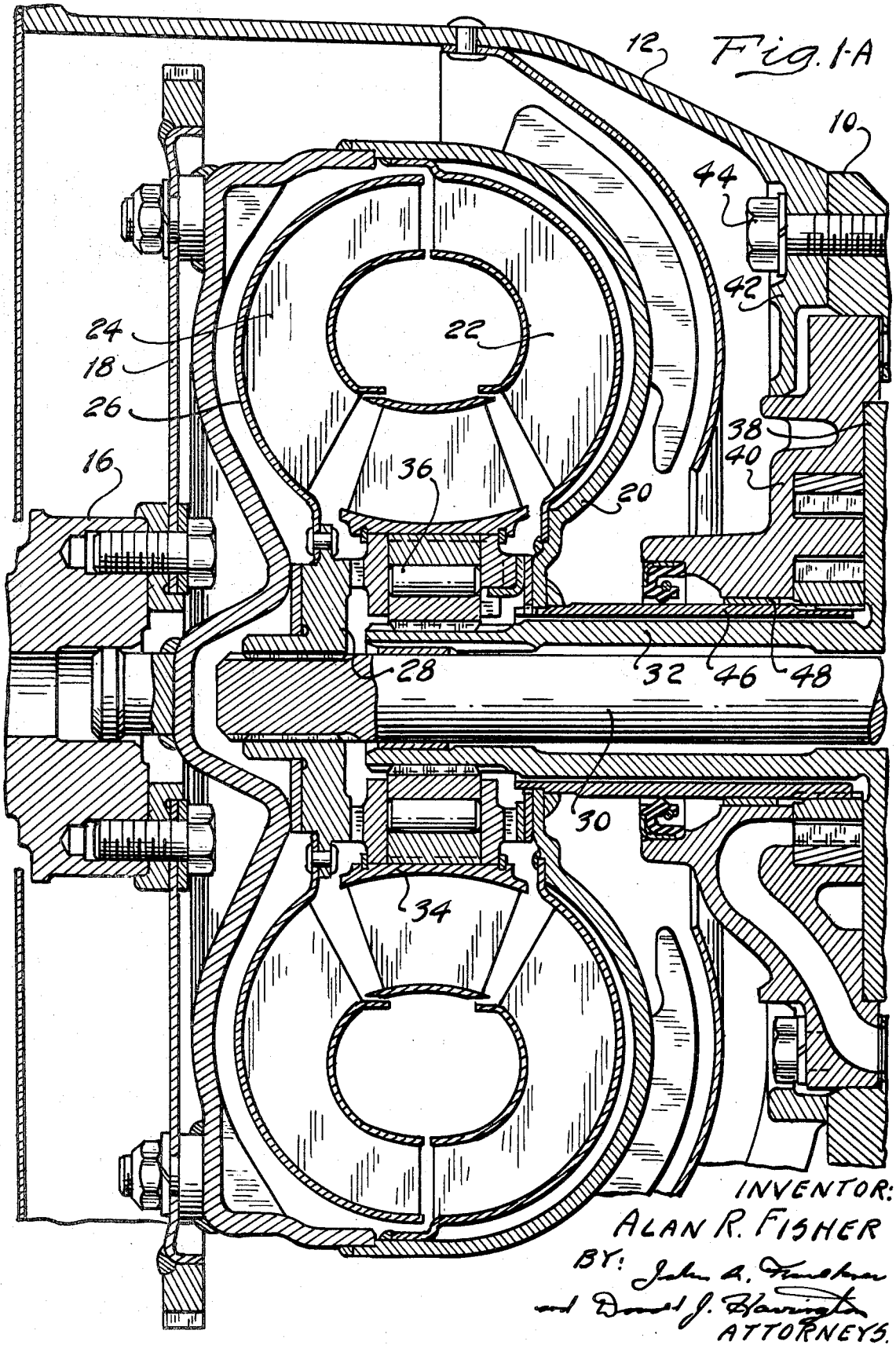

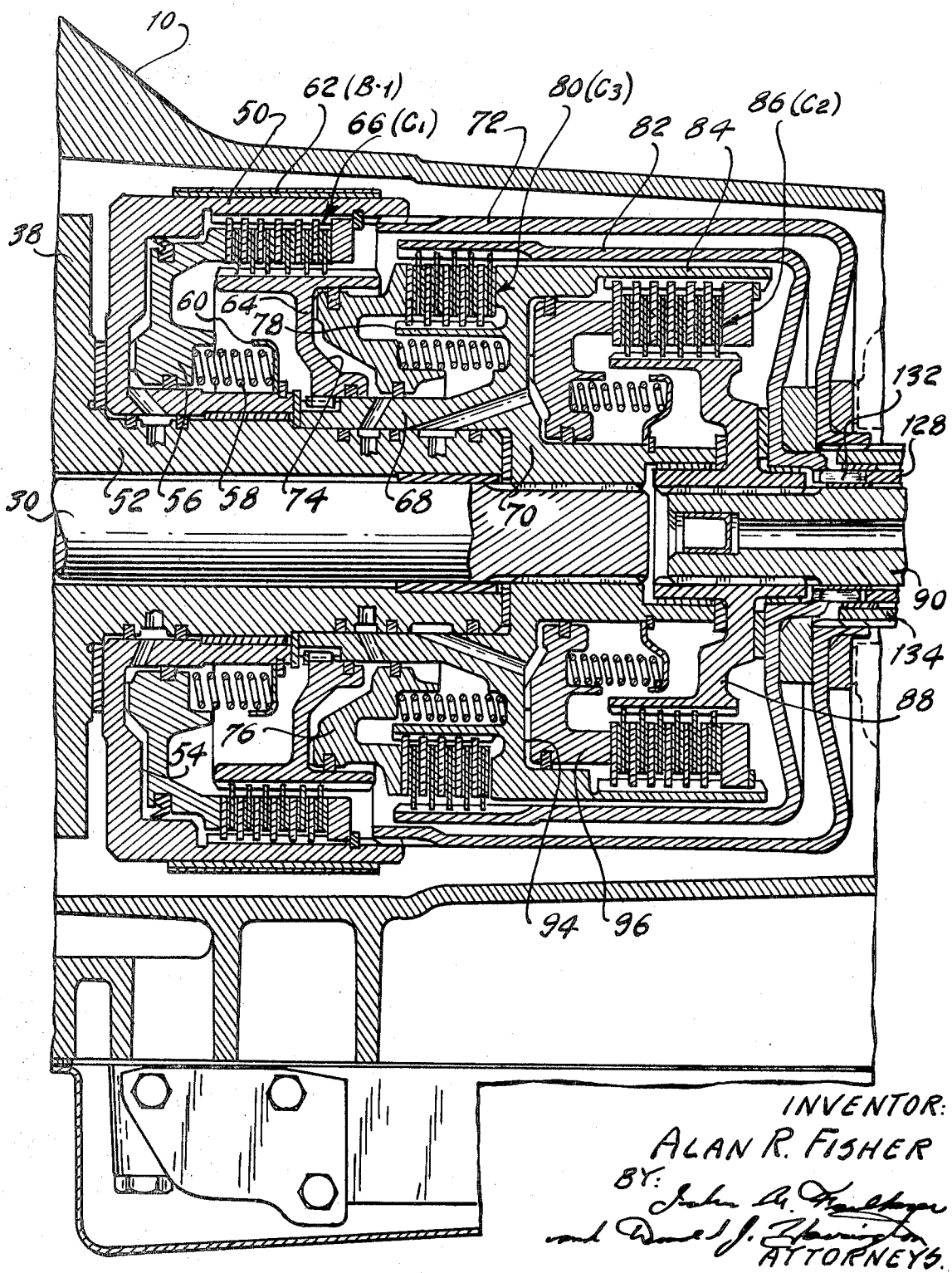

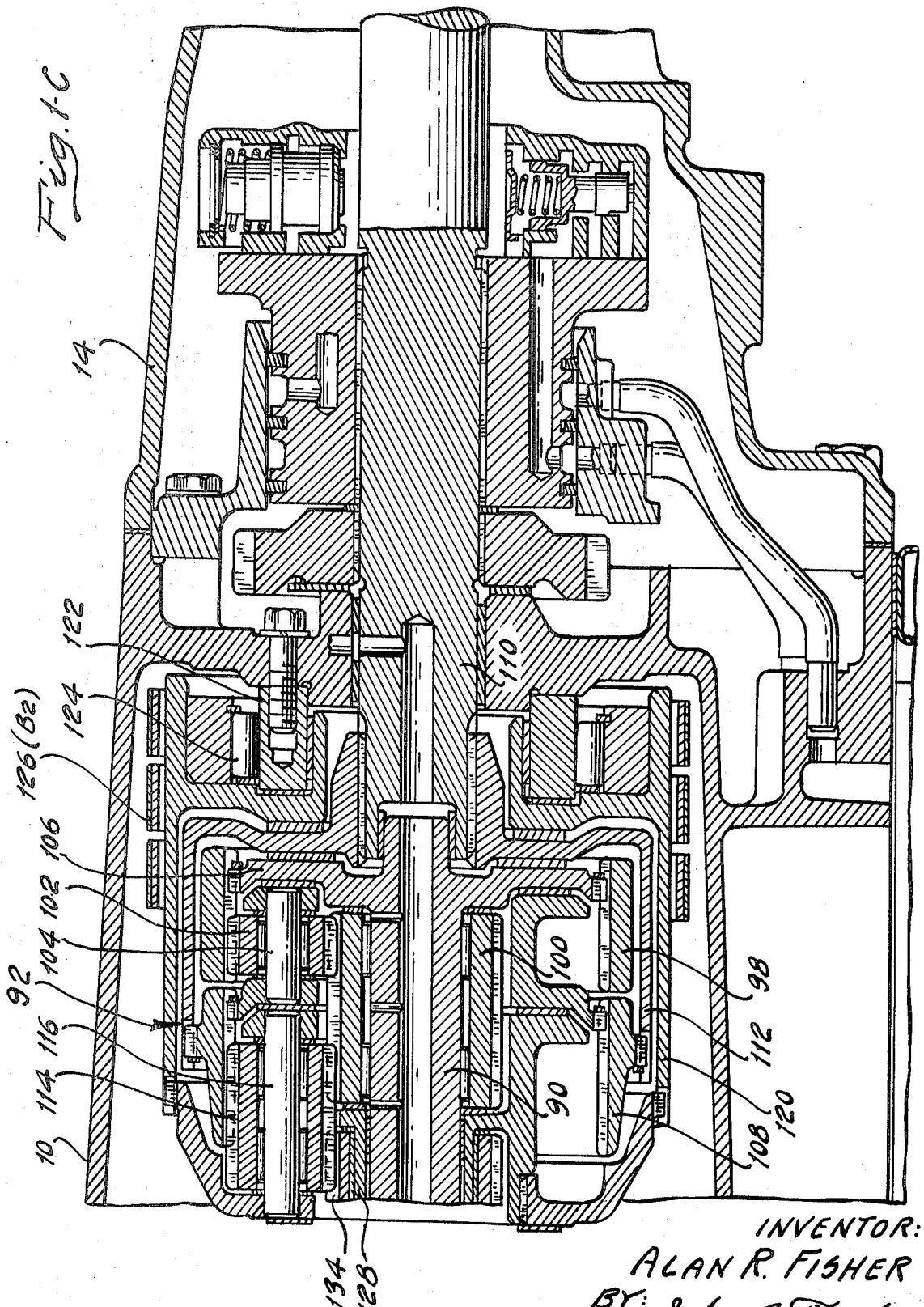

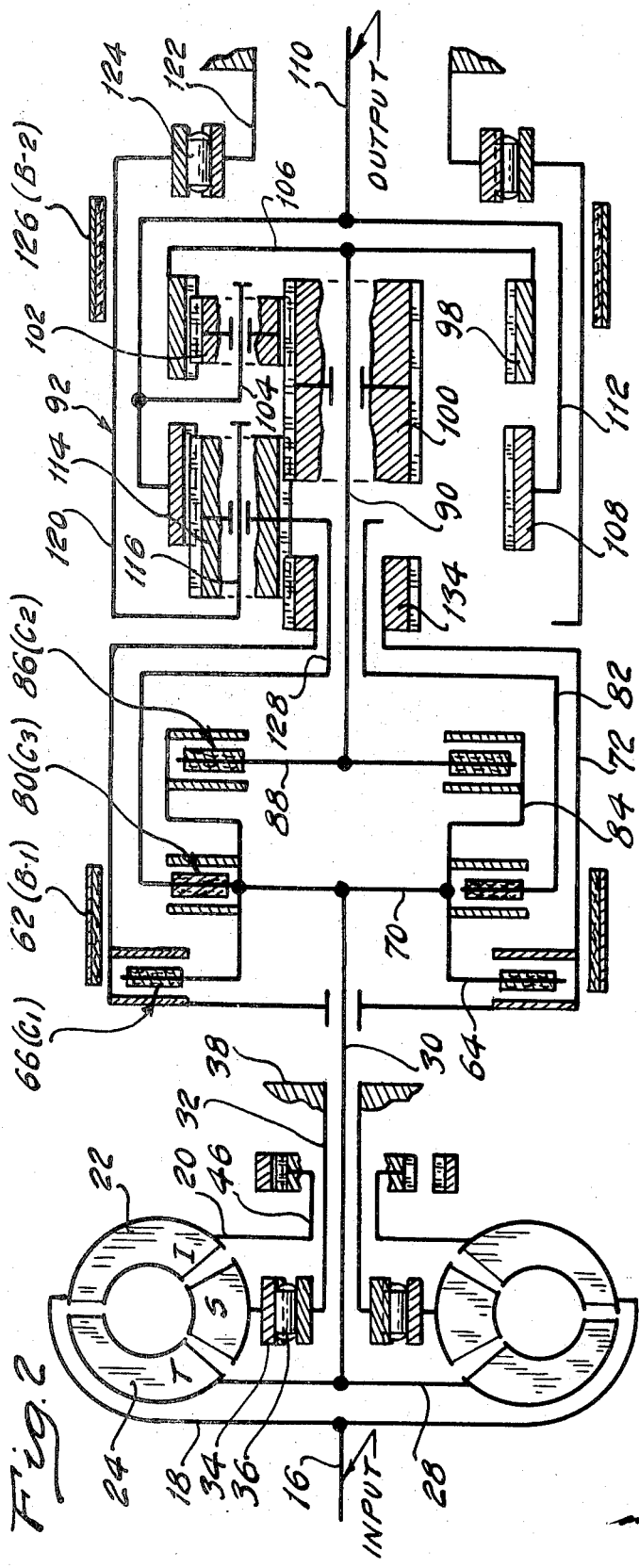

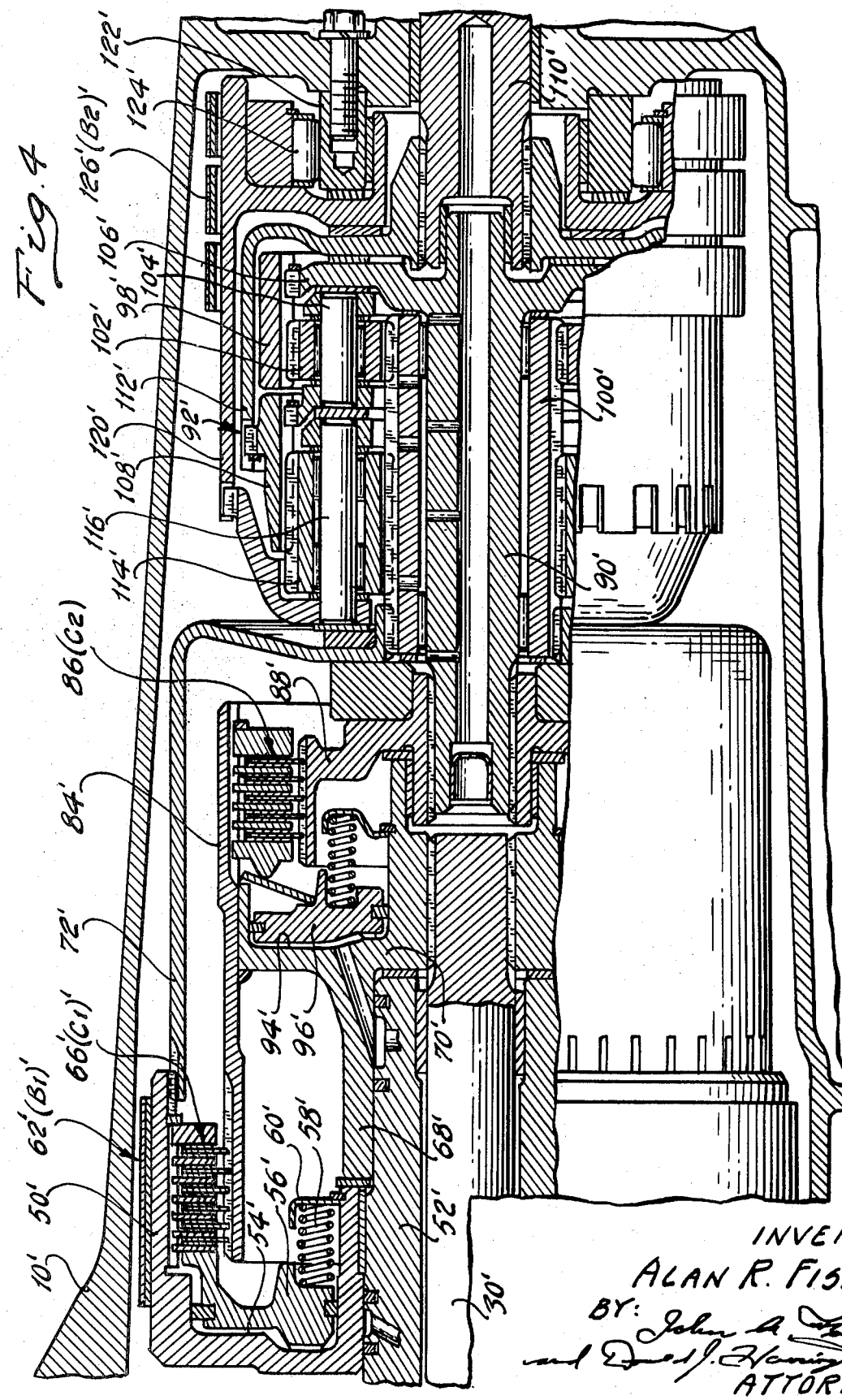

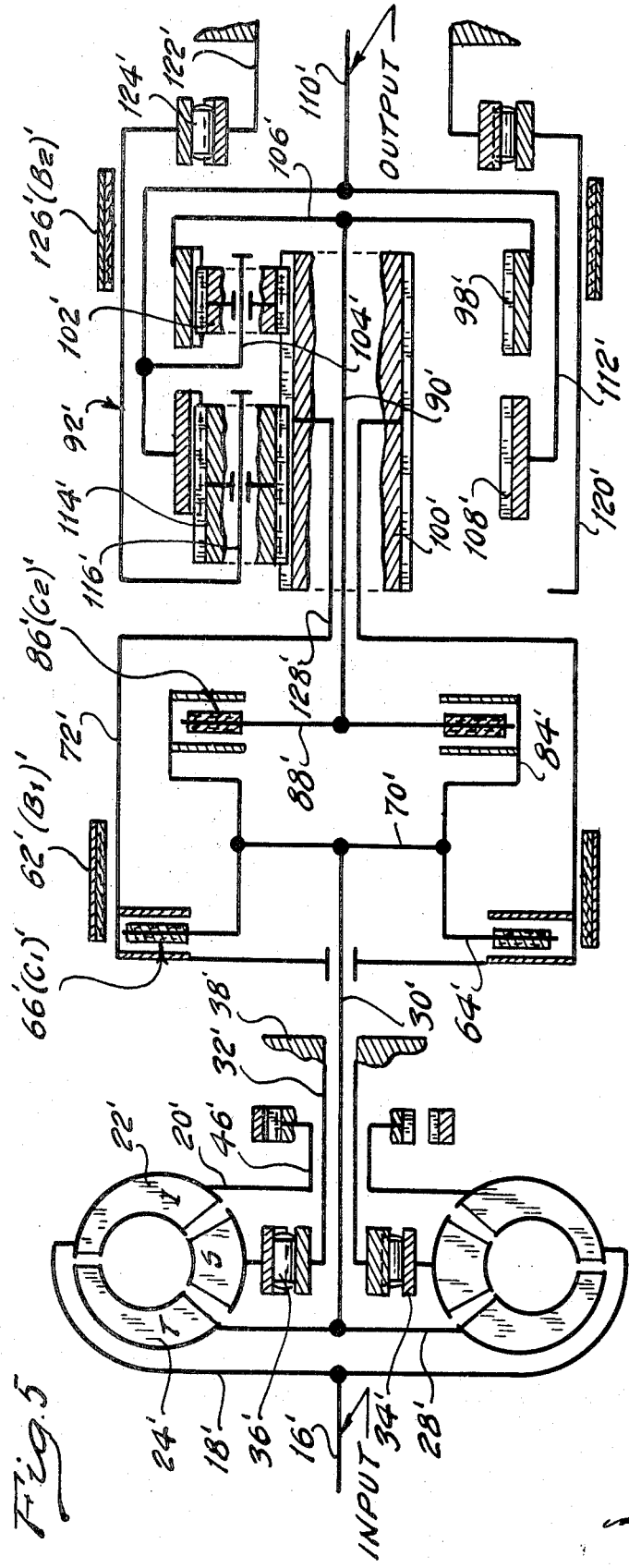

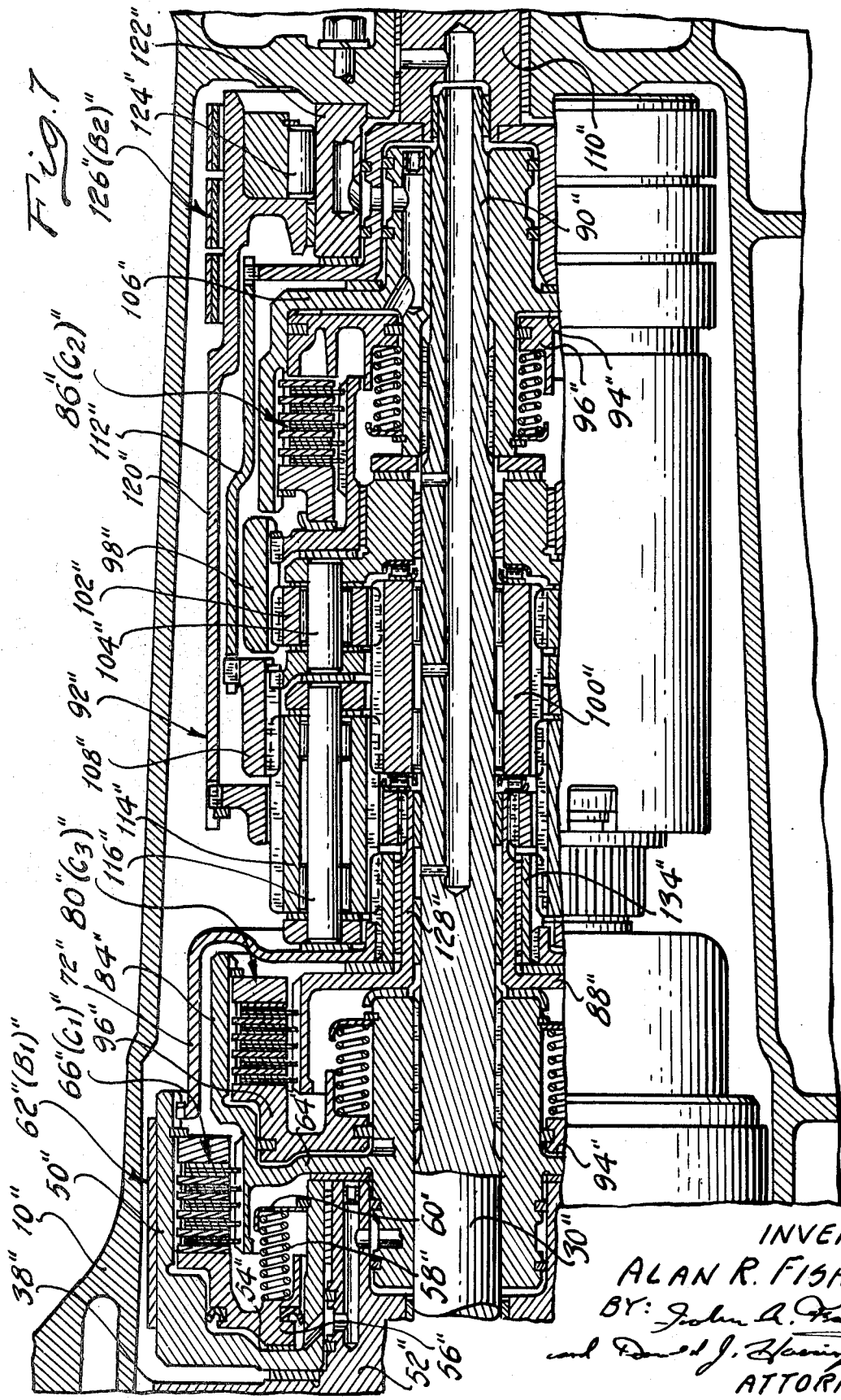

3,572,169
PLANETARY GEAR TRANSMISSION MECHANISM HAVING AN OVERDRIVE SPEED RATIO, A DIRECT-DRIVE RATIO AND MULTIPLE UNDER-DRIVE RATIOS
Alan R. Fisher, Highland Park, Mich., assignor to Ford Motor Company, Dearborn, Mich.
Filed Nov. 21, 1969, Ser. No. 878,720
Int. Cl. F16h 47/08, 57/10
U.S. Cl. 74—763
7 Claims

ABSTRACT OF THE DISCLOSURE

A planetary gear system having compound planetary gearing including two simple planetary gear units capable of establishing two under-drive ratios, an overdrive planetary gear unit including gear elements that are common to one of the simple planetary gear units, and a simplified clutch-and-brake system for controlling the relative motion of the elements of the gear units to establish the forward drive ratios as well as a reverse speed ratio.

GENERAL DESCRIPTION OF THE INVENTION

The improvements of my invention comprise a planetary gear transmission mechanism having elements that are common to known transmission mechanisms such as the one illustrated in U.S. Pat. No. 3,446,098. My invention is capable of establishing two under-drive speed ratios, a direct drive ratio, a reverse ratio and an overdrive ratio. Unlike other transmission mechanisms for use in automotive vehicle drive lines which are capable of establishing an overdrive torque transmitting path, a separate overdrive gear unit is not required. The overdrive condition is achieved by using gear elements that are common to the gear elements that establish the other drive ratios. Only one additional planetary gear element is required, and a simple modification of a second planetary gear element is required to achieve the additional overdrive function.

The gear arrangement illustrated in the aforesaid patent reference comprises two simple planetary gear units with a common sun gear element, the ring gear of one gear unit and the carrier of the other gear unit being connected to a driven member, and clutch-and-brake means for selectively connecting the ring gear of the other unit and the sun gear to a driving member. Provision is made also for clutching together two elements of the gear system to establish a direct drive condition. The carrier of the second gear unit acts as a reaction point during low-speed ratio operation, and the sun gear acts as a reaction point during intermediate speed ratio operation. These same characteristics are common to the transmission structure of my instant invention. In addition, however, I have provided an additional overdrive speed ratio, which may utilize either a hydrokinetic torque delivery path or a fully mechanical torque delivery path depending upon whether a direct-drive clutch for the converter is used.

The direct-drive clutch is used in cooperation with a hydrokinetic torque converter either to connect the turbine of the converter directly to the torque source, such as an internal combustion engine, or to allow the driving torque to be distributed to the turbine hydrokinetically. The overdrive gear elements utilize the ring gear of one of the gear units as well as the planetary gears on the cooperating carrier. The two simple planetary gear units of conventional systems such as those shown in the aforementioned reference patent, are in reverse disposition with respect to the corresponding planetary gear units of the structure of my instant invention, but this change in disposition does not alter their function.

In my improved structure, I have provided an overdrive sun gear, which meshes with the planetary pinions that correspond to the previously described first planetary gear unit. Those planetary pinions thus serve a portion of the overdrive gearing as well as the low speed ratio gearing and the reverse drive gearing. A minimum number of additional gear elements thus is needed to provide the additional overdrive function not available in prior art mechanisms employing the same basic planetary gear construction. Only one additional friction clutch mechanism is required to accomplish the additional overdrive function, although a second friction clutch may be employed for locking up the hydrokinetic torque converter as explained previously.

The provision of a transmission having these additional drive features with a minimum number of friction elements and a minimum number of additional gear elements is the object of this invention.

BRIEF DESCRIPTION OF THE FIGURES OF THE DRAWING

FIGS. 1A, 1B and 1C show in longitudinal cross sectional form a transmission assembly embodying the improvements of my invention.

FIG. 2 is a schematic diagram of the torque transmitting elements of the construction shown in FIGS. 1A, 1B and 1C.

FIG. 3 is a chart showing the clutch and brake engagement and release pattern for accomplishing the ratio changes in the mechanism of FIGS. 1A, 1B, 1C and 2.

FIG. 4 is a longitudinal cross-sectional view of a two-speed version of my invention. It includes elements that common to the three-speed version shown in the previously described figures.

FIG. 5 is a schematic drawing of the transmission structure of FIG. 4.

FIG. 6 is a chart showing the engagement and release pattern for accomplishing the ratio shifts in the transmission mechanisms of FIGS. 4 and 5.

FIG. 7 is an alternate three-speed version of the gear arrangement shown in FIGS. 1A, 1B and 1C.

PARTICULAR DESCRIPTION OF THE INVENTION

The transmission mechanism shown in FIGS. 1A, 1B and 1C includes a transmission housing 10, which encloses the main transmitting gear elements, a converter housing 12 at the forward end of the housing 10 and a tail shaft extension housing 14 at the rear end of the transmission housing 10.

A crankshaft for an internal combustion engine is shown in part at 16. It is connected drivably to a drive plate 18, which is geared at its periphery to an impeller shell 20. The shell encloses impeller blades 22, which define radial out-flow passages, which are in fluid communication with radial inflow passages defined by turbine blades 24. These blades are connected to an outer turbine shroud 26. A stator shaft surrounds the turbine shaft 30 and supports a bladed stator 34. The stator includes an overrunning brake 36 having an inner race which is splined to the stationary sleeve shaft 32. A supporting wall 38 is secured to pump housing 40, which in turn is connected at its periphery to internal flange 42 of the housing 12. Housing 12 is secured to the left end of the housing 10 by suitable bolts 44. Pump housing 40 contains positive displacement pump gear elements, which are drivably connected to an impeller driven sleeve 46 journaled in bearing opening 48 in the housing 40.

Clutch and brake drum 50 is journaled on support shaft 52 which is integrally formed with the plate 38. Drum 50 includes an annular cylinder 54, which receives annular piston 56. Piston return spring 58 urges normally the piston 56 in a left hand direction. The reaction force for the piston is taken on spring seat 60 carried by the hub of the drum 50. Brake band 62 surrounds the drum 50, and it can be applied and released in the usual fashion by means of a fluid pressure operated servo, not shown.

Externally splined clutch discs are carried by the internally splined periphery of the drum 50. These discs register with internally splined clutch discs carried by an externally splined clutch element 64. The clutch discs are identified generally by the reference characters 66.

Clutch element 64 is drivably connected to sleeve portion 68 of clutch element 70, which in turn is splined to the right hand end of the shaft 30. Drum 50 is connected drivably to torque transfer member 72.

Clutch element 64 and the sleeve portion 68 cooperate with each other to define an annular clutch cylinder 74 in which is situated annular piston 66. An externally splined portion 78 of the clutch element 70 carries internally splined clutch discs, which form a part of clutch disc assembly 80. These discs register with externally splined clutch discs carried by torque transfer member 82. When fluid pressure is admitted to the chamber 74, a clutch disc assembly 80 connects drivably the clutch element 70 with the torque transfer member 82. Similarly when cylinder 54 is pressurized, clutch disc assembly 66 connects drivably clutch element 70 with the torque transfer member 72.

Clutch element 70 defines also a clutch drum 84, which drivably carries externally splined clutch discs forming a part of a multiple disc clutch assembly 86. The assembly 86 includes also internally splined clutch discs that are drivably carried by clutch element 88 splined to torque delivery shaft 90 for a compound planetary gear system 92. An annular cylinder 94 is formed in the clutch element 70. An annular piston 96 is positioned in the cylinder 94. When the cylinder 94 is pressurized, the assembly 86 establishes a driving connection between the clutch element 70 and the shaft 90.

The gear unit 92 includes a ring gear 98, a sun gear 100 having separate sun gear portions which engage respectively the separate sets of planet pinions, one set of such planet pinion being shown at 102. The pinions are journaled on carrier 104. Pinions 102 engage drivably ring gear 98, which in turn is drivably connected to the shaft 90 through the radial torque transfer element 106.

A second ring gear 108 is connected drivably to power output shaft 110 through a torque transfer member 112, which surrounds the ring gear 98. Ring gear 108 is connected drivably to carrier 104.

A second set of planet pinions 114 engages drivably the second sun gear portion of the sun gear 100 as well as the ring gear 108. They are journaled on carrier 116, which in turn is drivably connected to a torque transfer drum 120 surrounding the other gear elements. The drum 120 serves as a brake drum, and it is journaled on the housing 10 by means of a bearing support 122. Support 122 serves as the inner race for a one-way brake 124, which anchors the drum 120 against rotation in one direction but permits free wheeling motion thereof in the opposite direction. A brake band 126 surrounds the drum 120 and is adapted to anchor the same when the torque reaction is in a direction that normally would tend to free wheel the brake 124. The carrier for the pinions 114 includes a sleeve 128 supported on shaft 90, which is keyed or otherwise connected as shown at 132 to the torque transfer drum 82. Sun gear 134 is drilled on the sleeve 128 and is keyed or splined to the right hand end of the torque transfer member 72.

The mechanism of FIGS. 1A, 1B and 1C is capable of establishing forward driving speed ratios and a single reverse speed ratio. one of the forward ratios being an overdrive. To establish the lowest driving speed ratio, the clutch disc assembly 86 is applied. This corresponds to clutch C-2. Brake band 126, which is identified in FIG. 3 as the brake band B-2, can be applied or released. In the former case the transmission will be capable of accommodating reverse torque delivery as well as forward driving torque delivery. The overrunning brake 124, which is identified in FIG. 3 by the symbol OWC, complements the action of brake band 126 and is capable of accommodating torque reaction in a forward driving direction. In these circumstances, turbine torque from the shaft 30 is delivered through engaged clutch C-2 and through the shaft 90 to the ring gear 98. This tends to rotate the sun gear 100 in a direction opposite to the direction of rotation of the ring gear 98.

Carrier torque on the carrier 104 is delivered to the driven shaft 110. A secondary torque delivery path, of which the sun gear 100 forms a part, also causes the driving torque to be delivered to the ring gear 108. This in turn tends to drive the output shaft 110 in a forward driving direction as the carrier 116 acts as a reaction member.

During operation in the low speed ratio, sun gear 134 does not form a part of the torque delivery gear train to initiate a ratio shift from the low speed ratio to the intermediate speed ratio. The sun gear 134 is anchored by engaging brake band 62, which is identified in FIG. 3 by the symbol B-1. This causes the sun gear 100 to be anchored thereby causing the same to function as a reaction point. Ring gear 98 continues to be driven by the shaft 90. Carrier 104, with ring gear 98 acting as a drive member, drives the ring gear 108 and the output shaft 110 at an increased speed relative to the speed of the shaft 30. Clutch C-2 is engaged, as it is during low speed ratio operation, and the other two clutches C-1 and C-3 remain disengaged.

To obtain a change in ratio from the intermediate speed ratio to the high speed direct drive ratio, brake band B-1 is disengaged, and clutches C-2 and C-3 are engaged simultaneously. This locks together the elements in the gear system for rotation in unison.

To accomplish a ratio change from the direct drive ratio to an overdrive ratio, clutch C-3 is applied and brake band B-1 is applied. Brake band B-1 anchors the sun gear 134, thereby permitting it to act as a reaction point. The carrier 132 acts as a power input element, and the ring gear 108 is over-driven.

Reverse drive is accomplished by engaging clutch C-1 and brake B-2, while the other friction members are disengaged. Sun gear 132 thus is connected through clutch C-1 to the turbine shaft. Carrier 116 is anchored by the brake band B-2 and serves as a reaction member, and the ring gear 108 then is driven in a reverse direction to cause reverse rotation of the output shaft 110.

The same elements are used in FIG. 4 as in the previously described embodiment, but the overdrive gear elements and the overdrive clutch are removed. This makes possible the elimination of the clutch disc assembly 80, the torque transfer element 82 and the sun gear 134. Instead of providing a relatively short sun gear 100 as in the previous embodiment, a longer sun gear, identified by reference character 100' is used in FIG. 4. The elements of the FIG. 4 embodiment that are common to the mechanism of FIGS. 1A, 1B and 1C have been indicated by similar reference characters, although prime notations are added. The ratio selections are made by engaging and disengaging the clutches and the brakes in accordance with the pattern outlined in the chart of FIG. 6. The gear tooth loadings are a maximum during reverse drive. The pinions 114, which are elongated, have the added advantage of increasing reverse torque capacity because of the increased tooth width of pinions 114.

The embodiment of FIG. 7 performs the same function as the embodiment of FIGS. 1A, 1B and 1C, although the clutch C-2 is located on the reverse side of the planetary gear elements rather than in the forward portion of the transmission housing, as indicated in FIGS. 1A, 1B and 1C. The elements of the FIG. 7 embodiment that are common to the elements of the embodiment of FIGS. 1A, 1B and 1C have been indicated by similar reference characters, although prime notations are added. The same clutch and brake engagement and release pattern described with reference to the earlier embodiment, and which is illustrated in FIG. 3, applies as well to the FIG. 7 embodiment.

Having thus described preferred forms of my invention, what I claim and desire to secure by U.S. Letters Patent is:

1. A power transmission mechanism adapted to deliver torque from a driving member to a driven member comprising a planetary gear system having first, second and third gear units, each gear unit having a sun gear, a ring gear and a set of planetary pinions, a carrier journaling each set of planetary pinions, the sun gears of said first and second units being common, the planetary pinions of said second and third units being common, the ring gear of said second unit being common to the ring gear of said third unit, the third unit having an additional sun gear, first clutch means for connecting selectively the ring gear of said first unit with said driving member, the carrier of said first unit being connected to the ring gear of said second unit, first brake means for anchoring the carrier of said second and third units to produce torque reaction during low-speed ratio operation and reverse drive operation, other brake means for anchoring said additional sun gear during intermediate speed ratio operation and overdrive operation, second clutch means for connecting selectively said driving member to the carrier of said second and third gear units during direct drive operation and during overdrive operation and third clutch means for connecting selectively the sun gear for said third gear unit to said driving shaft to produce reverse drive operation as the carrier for said second and third gear units is anchored, the carrier for said first gear unit and the ring gear for said second and third gear units being connected drivably to said driven member.

2. The combination as set forth in claim 1 wherein said first clutch means is located between said driving member and said gear elements, said second clutch means including a torque input element connected to said driving member and a torque output element surrounding said first clutch means and connected to the carrier for said second and third gear units, said third clutch means including a torque input element connected to said driving member and a torque output element surrounding said first and second clutch means and connected to the sun gear for said third gear unit.

3. The combination set forth in claim 1 wherein the output clutch element of said third clutch means defines a brake drum, said brake drum forming a part of a brake element of said other brake means for anchoring said additional sun gear of the third gear unit.

4. The combination set forth in claim 2 wherein the torque input element of said first clutch means defines a first annular pressure chamber, said torque input element of said first clutch means defining also a torque input element of said third clutch means, a second annular pressure chamber defined in part by the torque input element of said third clutch means, an annular piston received in each of said pressure chambers, said pressure chambers and the associated pistons defining in part fluid pressure operated servos for engaging and disengaging said first clutch means and said second clutch means.

5. The combination set forth in claim 3 wherein the torque input element of said first clutch means defines a first annular pressure chamber, said torque input element of said first clutch means defining also a torque input element of said third clutch means, a second annular pressure chamber, an annular piston received in each of said pressure chambers, said pressure chambers and the associated pistons defining in part fluid pressure operated servos for engaging and disengaging said first clutch means and said second clutch means.

6. The combination as set forth in claim 4 wherein the brake means for the carrier of said second gear unit and said third gear unit includes an overrunning brake having a first race connected to a stationary portion of said mechanism and a second race connected to the carrier of said second and third gear units and overrunning brake elements situated between said races whereby torque is distributed to said stationary portion in one direction, said last named brake means including further a friction member adapted to engage portions of the carrier for said second and third gear units, said friction member being anchored against said stationary portion of said mechanism whereby the carrier for said second and third gear units is anchored against rotation in both directions when said first brake means is applied.

7. The combination set forth in claim 5 wherein the brake means for the carrier of said second gear unit and said third gear unit includes an overrunning brake having a first race connected to a stationary portion of said mechanism and a second race connected to the carrier of said second and third gear units, and overrunning brake elements situated between said races whereby torque is distributed to said stationary portion in one direction, said last named brake means including further a friction member adapted to engage portions of the carrier for said second and third gear unit, said friction member being anchored against said stationary portion of said mechanism whereby the carrier for said second and third gear units is anchored against rotation in both directions when said first brake means is applied.

References Cited
UNITED STATES PATENTS 3,339,431    9/1967    Croswhite et al.    74—763X
3,523,468    8/1970    Kepner    74—763X ARTHUR T. MCKEON, Primary Examiner U.S. Cl. X.R.
74—731